United States Patent [19]

Theurer et al.

[11] 4,179,216
[45] Dec. 18, 1979

[54] APPARATUS FOR MEASURING THE PROFILE OF A RAILROAD TUNNEL

[75] Inventor: Josef Theurer; Klaus Riessberger, both of Vienna, Austria

[73] Assignee: Franz Plasser Bahnbaumaschinen-Industriegesellschaft m.b.H., Vienna, Austria

[21] Appl. No.: 907,813

[22] Filed: May 18, 1978

[30] Foreign Application Priority Data

May 31, 1977 [AT] Austria .................. 3848/77

[51] Int. Cl.² ........................ G01C 3/08; E01B 35/02
[52] U.S. Cl. ........................ 356/4; 33/338; 356/5; 356/152
[58] Field of Search ............ 356/1, 4, 5, 152, 120, 356/149; 33/338, 283, 284

[56] References Cited

U.S. PATENT DOCUMENTS

| 3,168,023 | 2/1965 | Harmon | 356/1 |
| 3,620,625 | 11/1971 | Tegholm | 356/1 |
| 3,705,772 | 12/1972 | Andreas | 356/5 |
| 3,869,805 | 3/1975 | Dieringer | 33/338 |
| 3,869,907 | 3/1975 | Plasser et al. | 33/338 |
| 3,950,096 | 4/1976 | Aeschlimann et al. | 356/4 |
| 4,063,283 | 12/1977 | Rider et al. | 356/4 |

FOREIGN PATENT DOCUMENTS 522204 12/1977 Switzerland .................. 356/1

Primary Examiner—S. C. Buczinski
Attorney, Agent, or Firm—Kurt Kelman

[57] ABSTRACT

A mobile apparatus for measuring the profile of a railroad tunnel comprising a car mounted for mobility on the railroad track, a beam emitter and receiver instrument capable of continuously receiving a signal corresponding to the distance of the tunnel profile from the instrument, a rotatable axle supporting the instrument on the car for pivoting about an axis extending parallel to the longitudinal track axis, and a drive arranged to pivot the instrument about the axis extending parallel to the track axis whereby the instrument may sweep the profile and continuously receive the signal.

11 Claims, 3 Drawing Figures

APPARATUS FOR MEASURING THE PROFILE OF A RAILROAD TUNNEL

The present invention relates to improvements in a mobile apparatus for measuring the profile or perimeter of a bounded space surrounding a track having two rails and a longitudinal axes intermediate and parallel to the rails, which comprises a car mounted for mobility on the track rails and a distance measuring instrument capable of receiving a signal corresponding to the distance of the profile of the bounded space from the instrument.

Known apparatus of this type may further comprise an indicating instrument operatively connected to the distance measuring instrument and capable of indicating the signal received thereby. If this indicating instrument is a recording instrument capable of making a graphic record of the received signal, the apparatus will serve not only to measure but also to indicate the profile or perimeter of the bounded space, and to store the recorded signals. The bounded space measured with such an apparatus may be a railroad tunnel or other bounded spaces through which railroad tracks pass.

Knowledge of the perimetric profile or outline of a bounded space surrounding a track in relation to the track position is of great importance to railroads. Trains passing over a track subject the same to dynamic loads which may cause local displacements of the track, which change the relative position of the track to the fixed profile of the surrounding bounded space. Therefore, it is necessary to establish the actual profile of a bounded space surrounding a track from time to time to ascertain its relationship to the track position, particularly before oversized freight is transported, so as to determine the narrowest portions of the bounded space. Those narrow spaces where the distance between track and fixed profile of the space cannot be increased, for instance in tunnels, bridges and along station platforms, are of special interest. An exact measurement of such track sections is an absolute safety requirement.

Stationary as well as mobile apparatus for measuring and indicating the regular railroad loading gauge of railroad tracks are known and are based on various measuring principles. In addition to purely mechanical measuring devices, it has also been proposed to use photographic, optical, laser beam and ultrasonic measuring methods for establishing the profile conditions of railroad track sections. The photographic methods permit only the taking of individual pictures of respective profiles from fixed points. While this method is relatively accurate, it is very time-consuming and it does not give a continuous picture of the profile or perimeter of the bounded space along an extended portion of the track.

In the examination of tunnels by optical methods, it has been proposed to mount a projector on a measuring car for generating a dispersed bundle of light beams in a plane extending perpendicularly to the longitudinal axis of the track, the line of intersection of the bundle of light beams with the wall of the tunnel being photographed by a camera carried on the car. At best, the longitudinal extension of the tunnel profile may then be established in a very time-consuming manner by subsequently evaluating and coordinating a multiplicity of individual pictures of the tunnel cross section.

Tunnel measuring instruments based on ultrasonic echoes have the disadvantage that their measurements are not fully reliable because of the diffuse diffraction of the ultrasonic beam on reflection from the tunnel walls.

In measuring the railroad loading gauge with known laser beam apparatus, the red points of two laser beam sources must be brought into registry with each other to determine the distance of each individual measured point. A number of single measurements are, therefore, required to obtain a single profile whose accuracy depends greatly on the skill of the operator. Measurements in the open additionally cause considerable problems in case of strong sunlight since the two laser beam points can then be found and brought into registry only with difficulty.

It is the primary object of this invention to provide a mobile apparatus of the first described kind, which makes it possible continuously to measure and record a railroad loading gauge while a car mounted for mobility on the track rapidly advances therealong.

It is another object of the invention to provide such an apparatus as an attachment to existing measuring cars or mobile track surfacing machines.

The above and other objects are accomplished in accordance with the present invention by a distance measuring instrument capable of continuously receiving a signal corresponding to the distance of the profile of the bounded space from the instrument, support means for supporting the instrument on a car mounted for mobility on the track rails for pivoting about an axis extending parallel to the longitudinal track axis, and a drive arranged to pivot the instrument about the axis extending parallel to the longitudinal track axis whereby the instrument may sweep the profile of the bounded space and continuously receive the signal.

Such an apparatus delivers, for the first time, a continuous sequence of measuring signals resulting in a measurement which may be directly evaluated and which clearly defines the cross section as well as the longitudinal extension of the measured profile. In the preferred embodiment, wherein transmission means connect the instrument drive to a drive for the car for pivoting the distance measuring instrument in synchronism with the car drive, the bounded space perimeter, such as a tunnel wall, is sensed by the instrument along a helical path wose pitch is determined by the transmission ratio between the pivoting drive for the instrument and the drive for the car, thus being independent of the forward speed of the car. If the transmission ratio is adjustable, a suitable ratio may be selected to change the number of pivotal movements of the instrument per the unit of length of the track whereby the reliability and the precision of the measuring results is adjusted to the operating requirements. This arrangement makes it possible to record the actual profile or perimeter of a tunnel in relation to the actual position of the track passing therethrough, and with exact coordination of the measured values with the longitudinal extension of the track, in a continuous graph, for example on an intermittently or continuously moving paper band or any other information recording carrier sheet.

The simple structure and the relative compactness of structural units incorporating this invention makes it possible to use existing special cars operated for various track maintenance work and to equip them with such units at a relatively low cost for acquiring the unit and mounting it on existing cars.

The above and other objects, advantages and features of the invention will become more apparent from the following detailed description of a now preferred embodiment thereof, taken in conjunction with the accompanying schematic drawing wherein FIG. 1 is a side elevational view of a measuring car equipped with a structural unit incorporating this invention;

Figure 1:
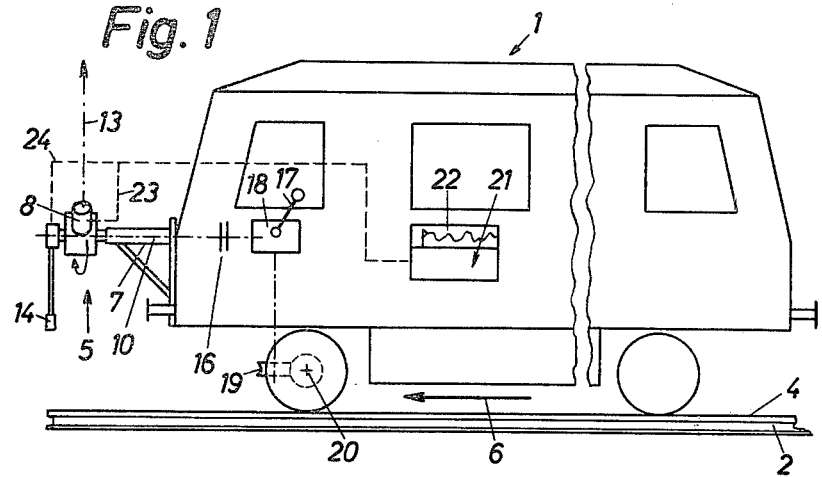

Referring now to the drawing, there is shown measuring car 1 mounted for mobility on rails 2 of track 4 having two rails fastened to ties 3 and longitudinal axis 9 intermediate and parallel to track rails 2. According to the present invention, this car is equipped with apparatus 5 for measuring the profile of a bounded space, such as tunnel, surrounding track 4, and for indicating and preferably recording the measured profile. The illustrated apparatus 5 is a structural unit mounted on and projecting forwardly from the front end of car 1, as seen in the working direction of the car indicated by arrow 6.

Apparatus 5 comprises a support means constituted by bracket 7 supporting distance measuring instrument 8 on the front end of the car for pivoting about an axis extending parallel to longitudinal track axis 9. A drive comprising rotatable axle 10 extending in the pivoting axis and carrying instrument 8 is arranged to pivot the instrument about the axis extending parallel to the longitudinal track axis whereby the instrument may sweep the profile or perimeter constituted in the illustrated embodiment by tunnel wall 25 and continuously receive a signal corresponding to the distance of wall 25 from instrument 8.

This arrangement has the advantage that the profile of the bounded space may be measured over its entire perimeter, including the ballast bed and track, so that the received signals and recorded graph will also show the two rails and their heads as marked reference points essential for the evaluation of the measurement. Furthermore, such equipment projecting from the front end of the car will make it possible readily to mount the apparatus on existing cars.

Figure 2:
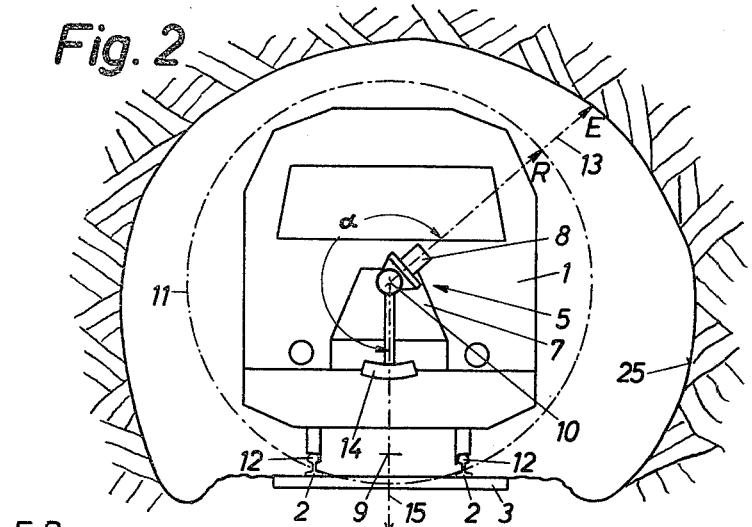
FIG. 2 is a front view of the apparatus of FIG. 1, shown in a tunnel.

In the preferred embodiment, as shown in FIG. 2, the pivoting axis of distance measuring instrument 8 is the center of a circle 11 with radius R circumscribed about car 1 in a plane extending transversely thereto and perpendicularly to pivoting axis 10, heads 12 of track rails 2 lying within circle 11. The distance measuring instrument preferably is an emitter and receiver of radiated energy, such as a radar or laser beam emitter and receiver. Since such instruments operate substantially without inertia, the advantages resulting from a continuous measurement may be fully attained therewith and reliable profile diagrams may be obtained even with a relatively high rotational speed of the instrument. Radar as well as laser beam devices are capable of measuring distances herein contemplated accurately within the range of centimeters. Furthermore, distance measurements with such devices yield analog voltage signals corresponding to the measured distance of the bounded space or the profile from the instrument.

The sweeping beam 13 of instrument 8 extends perpendicularly to pivoting axis 10 and moves always in a plane perpendicular to track axis 9, whatever its angular position.

Pendulum 14 is mounted on the car for pivoting in a plane extending perpendicular to axes 9 and 10, the illustrated pendulum being freely rotatably supported on rotatable axle 10 and thus always assuming a position in line with vertical 15, regardless of the superelevation of track 4.

As shown in the preferred embodiment, car 1 has a drive illustrated as front axle 20 which rotates during the forward movement of the car along the track. The car may be self-propelled, i.e. front axle 20 may be driven by a suitable power source, or it may be pulled or pushed, in which case the front axle will rotate freely. Transmission means connects the drive of measuring instrument 8, which is shown as rotatable axle 10, to the car drive, which is shown as front axle 20, for pivoting the distance measuring instrument in synchronism with the car drive. The illustrated transmission means comprises coupling 16 connecting rotatable axle 10 to transmission gear 18 which, in turn, is connected to gear 19 meshing with a gear on front axle 20. The transmission gear has an adjustable transmission ratio which may be controlled by control lever 17. This arrangement has the advantage that it requires no special power source for pivoting distance measuring instrument 8 and the driving force for the instrument is provided by the drive of the car. Even if an existing car used for other track working purposes is subsequently equipped with the distance measuring instrument of this invention, the connection to the drive of the car may be built in readily, for instance with a flexible axle. By using a transmission gear with adjustable transmission ratio, the accuracy of the measurement may be varied at will. With the use of an analog voltage signal corresponding to the measured distance, this distance may be indicated as a function of the forward movement of the instrument, which has a fixed relation to the pivoting movement of the instrument determined by the transmission ratio.

In the preferred apparatus described and illustrated, an indicating instrument 21 including recording instrument 22 is mounted on car 1 and is connected to distance measuring instrument 8 by conductor 23 whereby the signal received by instrument 8 is transmitted to instruments 21 and 22 for indicating and recording the received signal, the recording instrument producing a graphic record of the continuously received signal. Furthermore, pendulum 14 is operatively connected to recording instrument 22 by conductor 24 for indicating the angular position of distance measuring instrument 8 in relation to vertical 15. Since this angular position may be established by comparison with the position of the pendulum, it is possible by the transmission of a pulse signal indicating registry of the measuring beam axis with that of the vertically positioned pendulum to produce reference markers in the graph inscribed by recording instrument 22 to produce an image and evaluation of the graph independent of the superelevation of the track.

Figure 3:
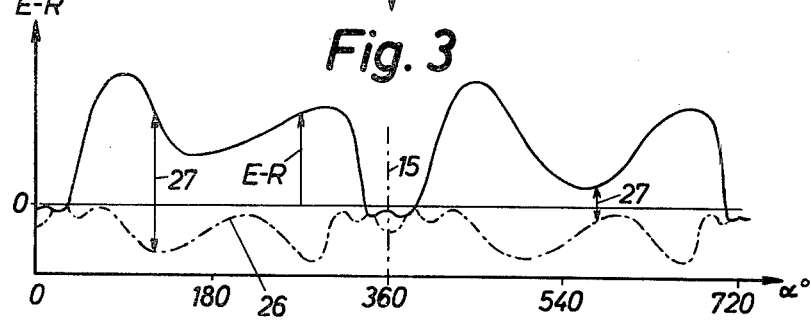
FIG. 3 is a tunnel profile graph recorded with the apparatus.

In view of the operative connection between car drive 20 and rotatable axle 10 driving instrument 8, the instrument is pivoted at a speed which is proportional to the speed of car 1. Accordingly, beam 13 emitted by instrument 8 moves in a helical path, the transmission ratio of gear 18 determining the pitch of the helix corresponding to the distance the car moves forward per rotation of axle 10. For a grahic representation of the measurement giving a detailed picture of the measured profile, a pitch in the range of magnitude of about 10 to 20 cm is sufficient. During the advancement of the measuring car, tunnel wall 25 is swept by rotating beam 13 emitted from instrument 8 and distances E sensed by the sweeping beam are continuously measured and transmitted in the form of analog electrical measuring signals to indicating and recording instruments 21 and 22. The recording instrument produces a written graph or any other suitable record on a continuously or intermittently advancing paper band or other information carrier wherein distances E appear as a function of the angle of rotation α in relation to vertical 15 and of the distance traversed by measuring car 1. For a better resolution of the signal, it is advantageous to deduct radius R from measured distance E and to picture the differential between E and R in the graph, as shown in FIG. 3, as a function of angle of rotation α. Since circle 11 subtends rail heads 12 of both rails 2, i.e. the rails heads lie within the circle, the measuring value falls below the zero line in the range of the rail heads so that these points, which are characteristic for the position of the track, are clearly visible in the graph. This provides a clear relation of the measuring graph to track 4 and track axis 9.

A template may be produced by a graph which presents the normal perimeter or boundary line 26 of car 1 in a form corresponding to the form of the measuring graph of the tunnel profile, and this template may be superimposed on the measuring graph to see whether all parts of the car boundary line, i.e. its circumference, has a sufficient desired distance 27 from tunnel wall 25.

The same procedure is followed to determine the possibility of an oversized load. In this case, the line of the circumference of the load in a transverse plane is transferred to a template by placing the polar coordinates from axis of rotation 10 thereon, and the feasibility of transporting the load over the measured track section is determined by superimposing the template on the measured graph.

All the measurements and evaluations according to the present invention may be effected automatically by suitably programmed computers. In this case, the measuring signals would have to be digitalized, i.e. the angular positions and the distance measurements would have to be related to the respective position of the measuring car and the radial distance corresponding to the boundary of the car would have to be deducted from the measured distance from instrument 8 to the profile of the bounded space. If the difference between these parameters is less than a given tolerance, the computer would indicate the exact location of this point.

Also, instead of the mechanical transmission described and illustrated, rotatable axle 20 and front axle 20 may be connected by an electrical synchronous control in the form of a rotating field motor. By the use of such a transmission, any existing rail-bound car may be equipped readily with a structural unit incorporating the present invention.

What is claimed is:

1. A mobile apparatus for measuring and indicating the profile of a bounded space surrounding a track having two rails and a longitudinal axis intermediate and parallel to the track rails, which comprises (a) a distance measuring instrument capable of continuously receiving a signal corresponding to the distance of the profile of the bounded space from the instrument,
(b) a car mounted for mobility on the track rails and supporting the instrument for pivoting about an axis extending parallel to the longitudinal track axis,
(c) a drive arranged to pivot the instrument about the axis extending parallel to the longitudinal track axis whereby the instrument may sweep the profile of the bounded space and continuously receive the signal, (1) the drive comprising a rotatable axle extending in the pivoting axis,
(d) a drive for moving the car on the track rails,
(e) a transmission means connecting the rotatable axle to the car drive for pivoting the distance measuring instrument in synchronism with the car drive, and
(f) an indicating instrument operatively connected to the distance measuring instrument and capable of indicating the signal received thereby.

2. The mobile apparatus of claim 1, wherein the distance measuring instrument is an emitter and receiver of radiated energy.

3. The mobile apparatus of claim 2, wherein the distance measuring instrument is a radar beam emitter and receiver.

4. The mobile apparatus of claim 2, wherein the distance measuring instrument is a laser beam emitter and receiver.

5. The mobile apparatus of claim 1, wherein the car has a front end, and comprising support means projecting forwardly of the front end for supporting the distance measuring instrument forwardly of the car.

6. The mobile apparatus of claim 1, wherein the pivoting axis of the distance measuring instrument is the center of a circle circumscribed about the car in a plane extending transversely thereto and perpendicularly to the pivoting axis.

7. The mobile apparatus of claim 6, wherein the track rails have heads and the rail heads are within the circle.

8. The mobile apparatus of claim 1, wherein the transmission means is a gear having an adjustable transmission ratio.

9. The mobile apparatus of claim 1, wherein the indicating instrument includes a recording instrument capable of making a graphic record of the continuously received signal.

10. The mobile apparatus of claim 9, further comprising a pendulum mounted on the car for pivoting in a plane extending perpendicularly to the axes and operatively connected to the recording instrument for indicating the angular position of the distance measuring instrument in relation to a vertical extending in said plane.

11. The mobile apparatus of claim 5, wherein the distance measuring instrument, the support means and the drive therefor constitute a separate structural unit mountable on the front end of the car.

* * * * *